INVENTORS.
Harry B. Thompson
William E. Morgan
BY Austin A. Webb
ATTORNEY

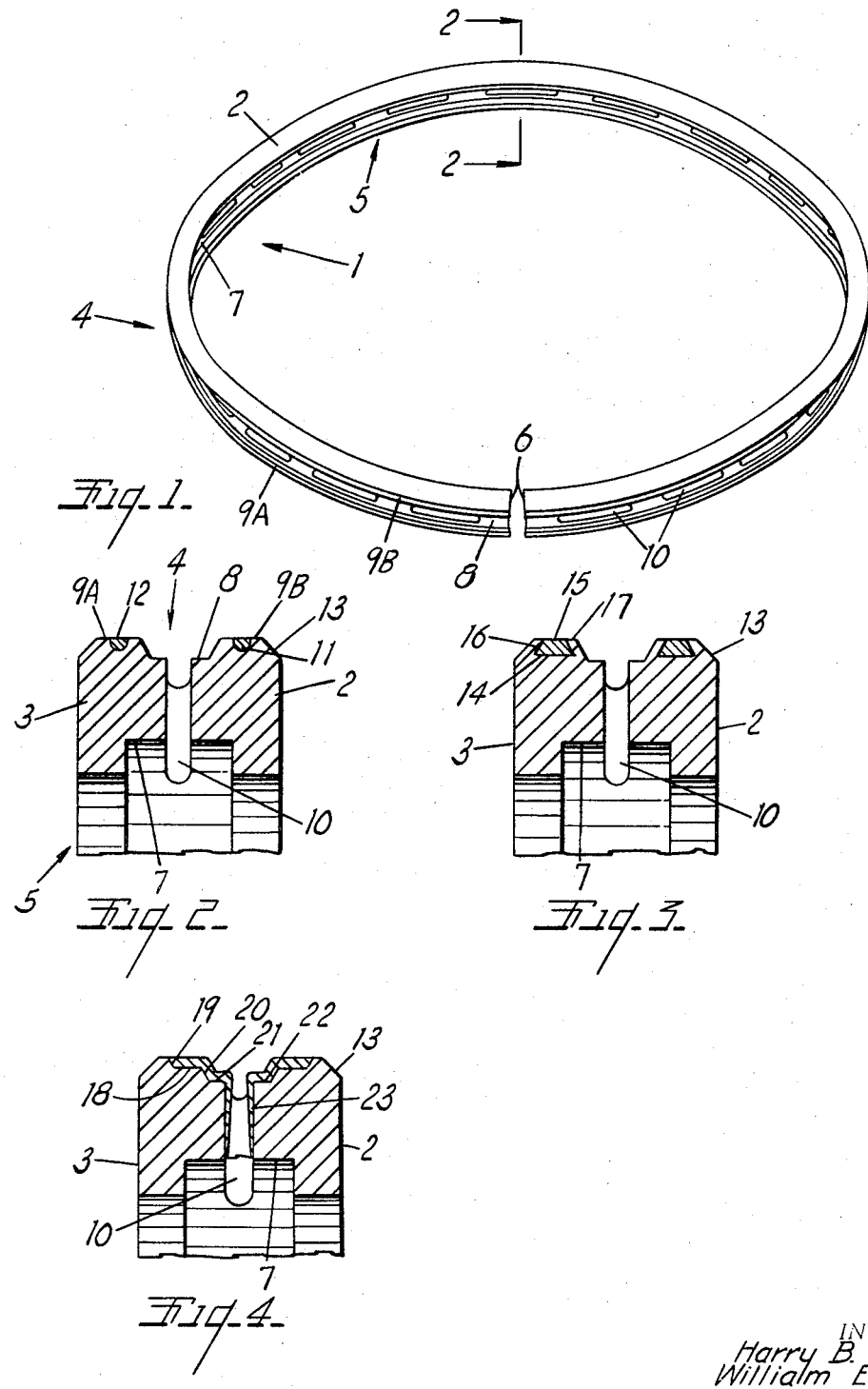

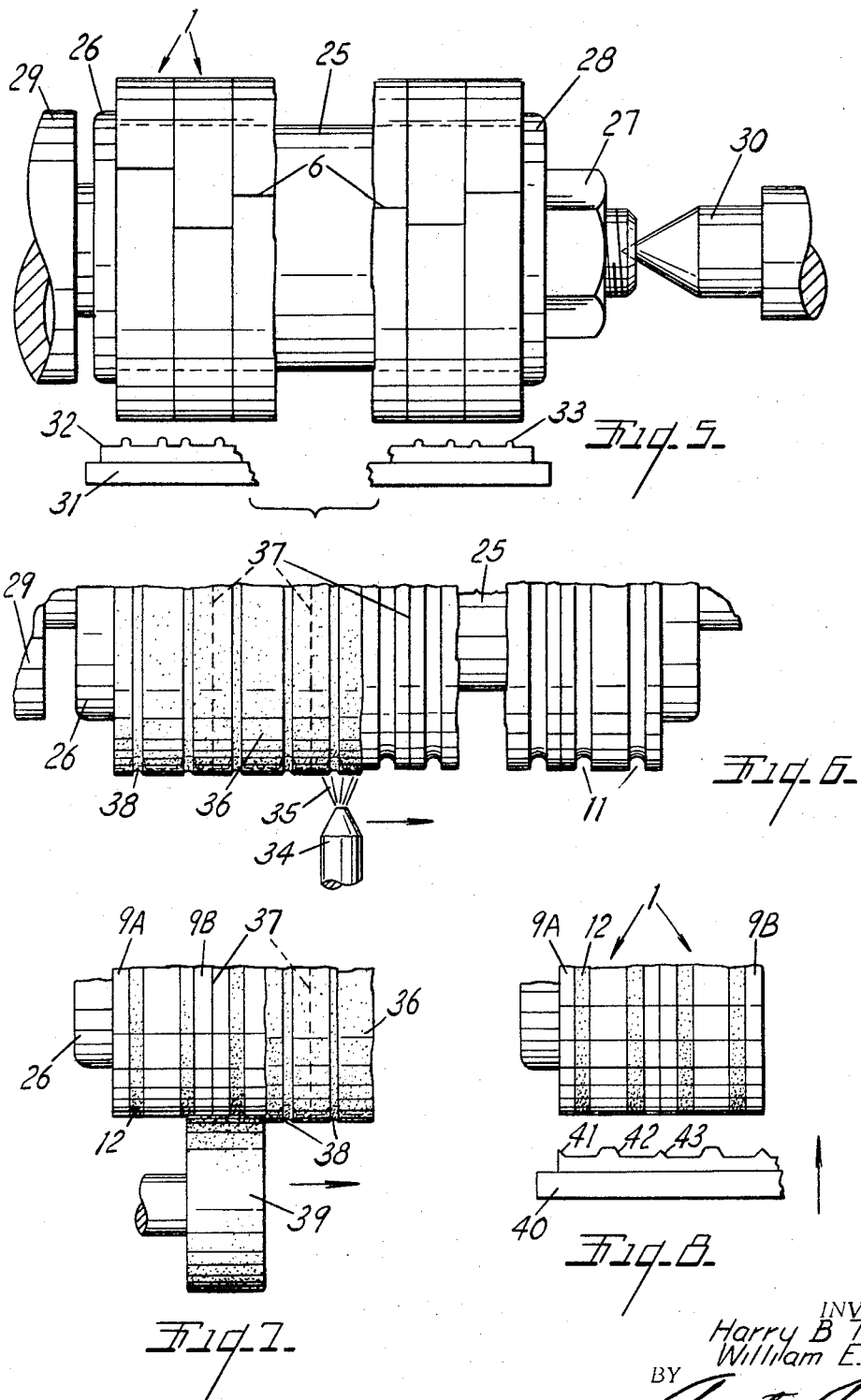

United States Patent Office 3,435,502
Patented Apr. 8, 1969

3,435,502
PISTON RING AND METHOD OF
MANUFACTURE THEREOF
Harry B. Thompson and William E. Morgan, Hastings,
Mich., assignors to Hastings Manufacturing Company,
Hastings, Mich.
Filed May 26, 1966, Ser. No. 553,093
Int. Cl. B63p 15/08
U.S. Cl. 29—156.63                              3 Claims

ABSTRACT OF THE DISCLOSURE

A group of cast iron piston ring blanks are clamped on a mandrel in end to end relation with the gaps in the rings closed. The mandrel is then rotated and axially spaced grooves are cut in the outer faces of the rings by a tool having multiple cutting edges. The outer faces of the rings are then coated with molybdenum to fill the grooves. The molybdenum is ground away to size the outer faces and finish the molybdenum in the grooves. A tool having multiple cutting projections then forms an external annular groove centrally in each blank between the spaced rings of molybdenum, and bevels each axial edge of the blanks. Radial grooves are then cut through the blanks from the bottoms of the central annular grooves, and the individual rings are removed from the mandrel.

---

The invention provides a method of manufacturing radially slotted oil control piston rings which permits the economical shaping of the outer faces of a plurality of rings and the application of wear resistant bands thereto in a minimum number of operations and with minimum wear on the shaping and finishing tools used.

Other objects and advantages of the invention will be apparent from a consideration of the following description and claims. The drawings of which there are three sheets illustrate three different modifications or types of the piston ring of the invention and two different series of steps for forming different types of the rings.

It has recently been discovered that certain materials having high wear and temperature resistant properties are desirable additions to the radially outer faces of piston rings and molybdenum has been found to be a desirable coating material and has been used on piston rings. The molybdenum is deposited in a known high temperature spray process which adheres and physically and chemically bonds the deposited molybdenum on the surface of the piston ring to which it is applied. The present invention provides for the depositing and formation of molybdenum or similar wear resistant coatings in novel and desirable positions on the rings and in a manner or method of application which facilitates the formation of the coated rings and permits the mass finishing of several rings as a group.

The rings and their method of manufacture disclosed herein are particularly adapted for use as oil control piston rings but certain characteristics of the rings and the method of manufacture are equally applicable to other piston rings such as compression rings as will be described and as are covered by the claims appended herein.

FIG. 1 is a perspective view of a common type of oil control ring embodying the features of the invention and adapted to be manufactured by the method of the invention.

FIG. 2 is a fragmentary cross sectional view taken along the plane of the line 2—2 in FIG. 1 and illustrating a first form of the piston ring.

FIG. 3 is a view similar to FIG. 2 illustrating a modified form of the piston ring.

FIG. 4 is another view similar to FIG. 2 but illustrating a further modified form of the ring of the invention.

FIG. 5 is a fragmentary elevational view illustrating an early step in the method of manufacturing some forms of the ring such as those in FIGS. 2 and 3.

FIG. 6 is a fragmentary elevational view with parts broken away and illustrating a later step in the formation of the piston rings.

FIG. 7 is a fragmentary elevational view of a further intermediate finishing step in the formation of the rings.

FIG. 8 is a fragmentary elevational view conventionally illustrating a similar shaping step in the method of manufacturing the rings.

Figure 9:
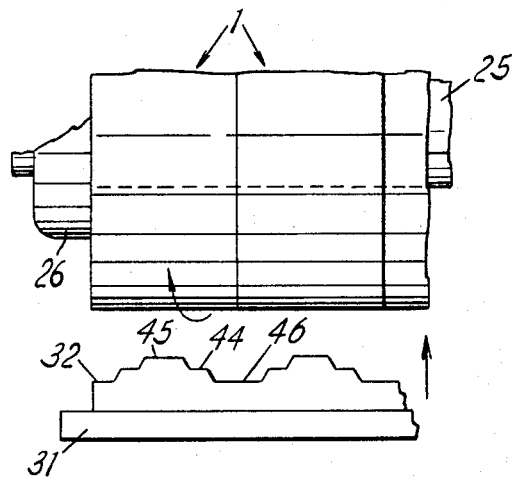
FIG. 9 is a fragmentary elevational view with parts broken away and conventionally illustrating an early forming step in a modified form of the method of manufacturing the rings of the invention.

In FIG. 1 there is illustrated a relatively common type of oil control piston ring generally indicated at 1 and having an axially upper side 2 with a lower side 3 opposite. The ring is of generally rectangular cross section and is formed as such initially by known methods to provide a radially outer face generally indicated at 4 and a radially inner face generally indicated at 5. The ring is generally circular and is provided with a radial gap defined by ends 6 of the annular body. The inner face 5 of the ring is radially outwardly grooved or recessed in the center as at 7 to receive an expander ring if desired or for other purposes and the outer face 4 of the ring has an axially central portion 8 of radially reduced or recessed size so that the outer face of the ring has two axially spaced radially outer bearing areas 9A and 9B. The body of the ring is radially slotted as at 10 by a plurality of slots formed parallel to the sides 2 and 3 to permit the escape of oil wiped off of the cylinder walls into the interior of the ring.

The axially spaced bearing surfaces 9A and 9B are each provided with annular grooves 11 of semicircular cross section which extend to the gap ends 6 of the ring body and which are filled with continuous annular masses 12 of molybdenum or other wear resistant material. The radially outer corners of the body of the ring are chamfer or formed at an axial incline or bevel at 13. It is pointed out that the bearing surfaces 9A and 9B extend on both sides of the molybdenum masses 12 and that the radially outer surfaces of the molybdenum and the adjacent portions of the body of the ring are finished in generally flush cylindrical surfaces.

The ring as disclosed in FIGS. 1 and 2 locates the highly wear and heat resistant molybdenum masses 12 in accurately located axially spaced bands around the ring while at the same time providing axial and radial support for the bodies of molybdenum which has relatively low tensile strength so that the molybdenum is effectively retained in the desired position around the outer face of the ring. As the outer face wears during sliding contact with a cylinder wall the molybdenum bands reduce the rate of such wear while the adjacent portions of the ring body which is usually made of cast iron continue to support and retain the remaining portions of the wear resistant bands.

FIG. 3 illustrates a modified form of the piston ring shown in FIGS. 1 and 2. In this modified form of the ring the only difference is the cross sectional shape of the annular grooves 14 and the corresponding cross sectional shape of the annular masses 15 of molybdenum. The sides of the grooves 14 are axially tapered or inclined as at 16 so that the band of molybdenum is overlaid along its edges by the adjacent portions 17 of the sides of the grooves.

The second modified form of ring cross section shown in FIG. 4 has the same generally rectangular outline, radially inner recess and beveled or chamfered outer corners as the other forms of the ring illustrated. The outer face of the ring is shaped with a first relatively shallow radially reduced portion or groove 18 with an axially outwardly beveled edge 19 located toward the opposite sides of the ring. Toward the center of the ring the groove is further radially reduced or recessed by the beveled surfaces 20 to a central reduced portion 21 through which the radial grooves 10 of the previous forms of the ring are formed.

The entire adjacent and connected surface from the beveled sides 19, across the groove 18, bevels 20 and base 21 are covered with an integral mass 22 of wear resistant material such as molybdenum and the mass extends in reducing thickness along the surfaces of the slots 10 as at 23. Where the cross section of the ring is not radially slotted as at 24 in FIG. 11, the mass of molybdenum 22 extends integrally across the base 21 of the recess.

The rings of the foregoing forms of the invention are economically manufactured by the steps shown in the remaining figures. Metal or other cast iron rings of generally rectangular cross section and of desired size are formed by known means and a plurality of these ring blanks are mounted on a mandrel 25 of proper diameter to support the inner faces 5 of the rings with the gap ends 6 collapsed to closed operating position. A plurality of these ring blanks are then clamped on the mandrel against a shoulder 26 by a suitable nut 27 and clamp ring 28 to hold the rings collapsed and in axially side by side concentric relation. The mandrel 25 is then placed in a turning machine such as the chuck of a lathe indicated conventionally at 29 and supported by the tail stock pin 30 so that the several rings forming a substantially continuous cylindrical surface can be rotated. A shaping tool conventionally illustrated at 31 and having a properly shaped metal working edge 32 is then advanced against the side of the rotating group of rings to shape the outer faces of the ring blanks. The working edge 32 may be a cutting tool or a grinding tool and in the example illustrated in FIG. 5 is provided with properly shaped projections or teeth 33 for forming the grooves 11 of the first form of the ring shown in FIG. 2.

After the several rings have been formed to provide the groove 11, the group of rings are subjected to a known type of high temperature spray application of a wear resistant material such as molybdenum. FIG. 6 conventionally illustrates a nozzle or jet 34 that progressively deposits or directs a spray 35 of molybdenum on the assembled rings to provide a continuous coating 36 of molybdenum. Note that the adjacent edges or sides of several ring blanks are covered by the molybdenum coating as indicated by the dotted lines at 37. The coating 36 partially fills the grooves 12 in the rings as is indicated by the shallower grooves 38 in the coated portion of the group of rings.

The several coated rings are next subjected to a finishing operation illustrated in FIG. 7 in which a suitable finishing tool such as a rotating grinding wheel 39 is advanced axially and tangentially along the assembled rings on the mandrel to grind off both the radially outer faces 9A and 9B down to the level of the deposited mass of molybdenum 12 and the intervening central portion of the outer face of each ring. This operation both sizes the outer face 34 of the ring and uncovers the adjacent edges 37 of adjacent rings so that the ring blanks are again entirely separate and unconnected by the molybdenum coating.

After the external sizing operation shown in FIG. 7 is complete the group of rings on the mandrel are subjected to the forming action of a second shaping tool conventionally illustrated in FIG. 8 at 40 and having a shaping or metal working edge with desired projecting cutting edges 41, 42 and 43. The edges 41 and 43 form the chamfered edges 13 on the ring blanks and the edge 42 forms the axially central recess 8 in the ring blanks. The blanks with the finished outer faces 9A and 9B and the embedded bands 12 of molybdenum can then be removed from the mandrel for formation of the radial slots 10 or the slots may be formed on the several rings of a group by a multiple cutting tool operating simultaneously on all of the rings. It should be noted that the radial inner recess or groove 7 if used may be formed in the ring blanks before or after the steps shown in FIGS. 5 through 8. Further the shape of the projections 33 on the forming edge 32 will determine the shape of the grooves in the outer face of the rings and the form of the ring shown in FIG. 3 can be manufactured by the same general process by providing cutting edges of the proper shape and advancing them at the proper angle to the cylindrical surface of the group of rings.

It is further pointed out that the steps or operations illustrated in FIGS. 7 and 8 may be reversed or modified so that the shaping edges 41, 42 and 43 cut through the molybdenum coating 36 to shape the rings before the rings are finished by the grinding wheel 39. However, since the very nature of the molybdenum coating 36 is to be highly resistant to wear it would have a rapid dulling action on the shaping edges 41, 42 and 43 and the prior performance of the grinding and finishing operation in FIG. 7 is preferred. Note that the grinding wheel 39 may be made long enough to simultaneously grind the surface of the entire group of rings by being advanced radially toward the mandrel rather than by being advanced axially along the group as shown in FIG. 7.

Figure 10:
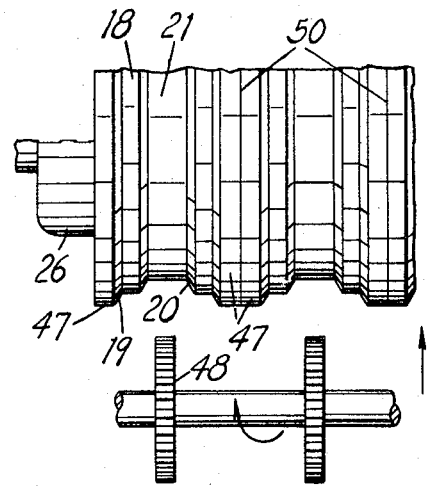
FIG. 10 is a fragmentary elevational view illustrating a further shaping or forming step in the modified method of manufacturing the piston ring of the invention.

FIGS. 9 through 12 illustrate a modified series of steps or method for producing the form of ring shown in FIG. 4. Again, a series of several ring blanks 1 are assembled and clamped in closed position on a mandrel 25 and a forming tool 31 having a shaping edge 32 is advanced radially against the side of the assembled blanks. In this form of the method the edge 32 has intermediate projections 44 on each side of central or longer projections 45 and the projections are spaced as at 46. The shaping edges 44, 45 and 46 form the bare cast iron metal surfaces of the rings to provide the central recesses 21 and intermediate depth grooves 18 with the chamfer edges 19 and 20 as shown in FIG. 10. The axially spaced outer sides 47 of the ring blanks may also be sized by the tool 32 but this is not important. After the sizes of the rings are thus formed the radial grooves 10 may be formed by suitable milling cutters 48 advanced into the central recess 21.

Figure 11:
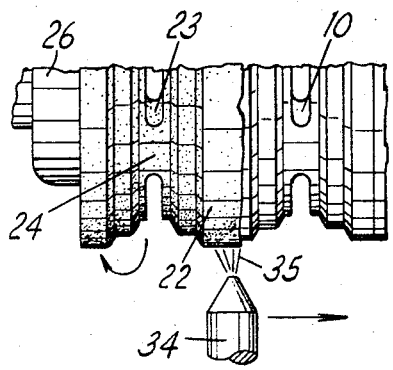
FIG. 11 is a fragmentary elevational view conventionally illustrating a modified method or step of applying the wear resistant bands or coating to the particularly shaped and finished rings shown in FIG. 10.
Figure 12:
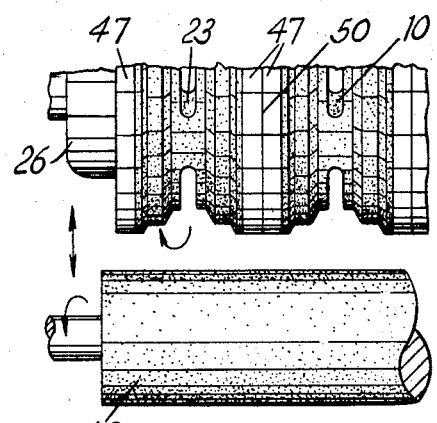
FIG. 12 is a fragmentary elevational view conventionally illustrating a further finishing and operating step for forming the rings of the invention.

With the outer faces of the ring blanks thus preshaped and formed the group of rings is subjected to the spray application of molybdenum by the nozzle 34 as indicated in FIG. 11 to deposit the coating 22 and 23 over the exposed surfaces of the rings. The rings are then sized to the surfaces 47 and the molydenum removed therefrom by a shaping operation as shown in FIG. 12. In the example shown in FIG. 12 the continuous abrasive grinding roll 49 is advanced against the sides of the rotating group of rings to simultaneously remove the molybdenum from the surfaces 47 and size those surfaces. Removal of this molybdenum exposes the adjacent edges 50 so that the individual rings separate easily when removed from the mandrel.

After the completion of the shaping and sizing operation as shown in FIG. 12, the chamfered edges 13 of the ring in FIG. 4 may be formed by any suitable and well known means so the formation of this surface is not specifically illustrated. The chamfers may be formed simultaneously on all rings of the group by a tool having forming edges such as 41 and 43 in FIG. 8 or the chamfers may be formed on the individual rings independently.

Note that the removal of the undesired molybdenum coating and the sizing of the outer faces of the rings in FIG. 12 may be performed by a tool or operation comparable to that shown in FIG. 7; that is, the tool and operation shown in FIG. 7 is interchangeable with the tool and operation shown in FIG. 12 and vice versa.

In all cases a highly desirable form of piston ring with axially spaced wear resistant bands is formed to proper size with the bands retained by radially exposed surfaces of the rings and the rings can be economically manufactured in multiple groups. It is a feature of all forms of the finished ring, and all of the methods of forming it, that the wearing surfaces formed by the bands of molybdenum are accurately located as to their axial positions on the rings. Any irregularity of thickness of the deposited molybdenum coating is eliminated as far as the position of its axially side edges is concerned, when the radially outer face of the coating is finished down to the adjacent edges of the annular portions of maximum diameter of the ring bodies. These edges are accurately controlled by shaping the grooves or recesses before the coating is applied. Various recombinations of steps of the two forms of the method illustrated, and different variations of the species of the rings illustrated can be used without departing from the theory and scope of the invention as defined in the following claim.

What is claimed as new is:

1. The method of manufacturing piston rings which comprises the steps of clamping ring bodies of generally square cross section axially against each other on a mandrel,
    subjecting the outer faces of said rings so clamped to a shaping operation to form a pair of axially spaced annular grooves around each ring,
    subjecting the outer faces of said rings so shaped and clamped to a depositing operation to adhere a mass of wear resistant material over the exposed surfaces of the rings and to at least partially fill said groove with said material,
    finishing the outer surface of said mass so adhered and the outer surfaces of said rings to expose the surfaces of said bodies adjacent to said grooves in flush relation to the surface of the material in the grooves,
    cutting central exterior annular grooves in said bodies between said axially spaced and filled grooves,
    and cutting radial grooves through said bodies from the bottoms of said central grooves.

2. The method as defined in claim 1 which includes a step of cutting bevels on the exterior edges of said ring bodies after the step of finishing the surface of said mass.

3. The method as defined in claim 2 in which said step of cutting said bevels is performed simultaneously with the step of cutting said central exterior grooves.

References Cited

UNITED STATES PATENTS

| | | |
|---|---|---|
| 2,436,227 | 2/1948 | Phillips. |
| 2,905,512 | 9/1959 | Anderson. |
| 2,919,486 | 1/1960 | Banquarel _____ 29—156.6 |
| 3,133,739 | 5/1964 | Marien _____ 277—235 |
| 3,133,341 | 5/1964 | Marien _____ 29—156.63 |
| 3,337,938 | 8/1967 | Prasse _____ 29—156.6 |

JOHN F. CAMPBELL, *Primary Examiner.*

PAUL M. COHEN, *Assistant Examiner.*

U.S. Cl. X.R.

29—156.5; 277—235